Jan. 28, 1958    J. F. MARTIN    2,821,275
POWER OPERATED EMERGENCY BRAKE
Filed Jan. 27, 1956    4 Sheets-Sheet 1
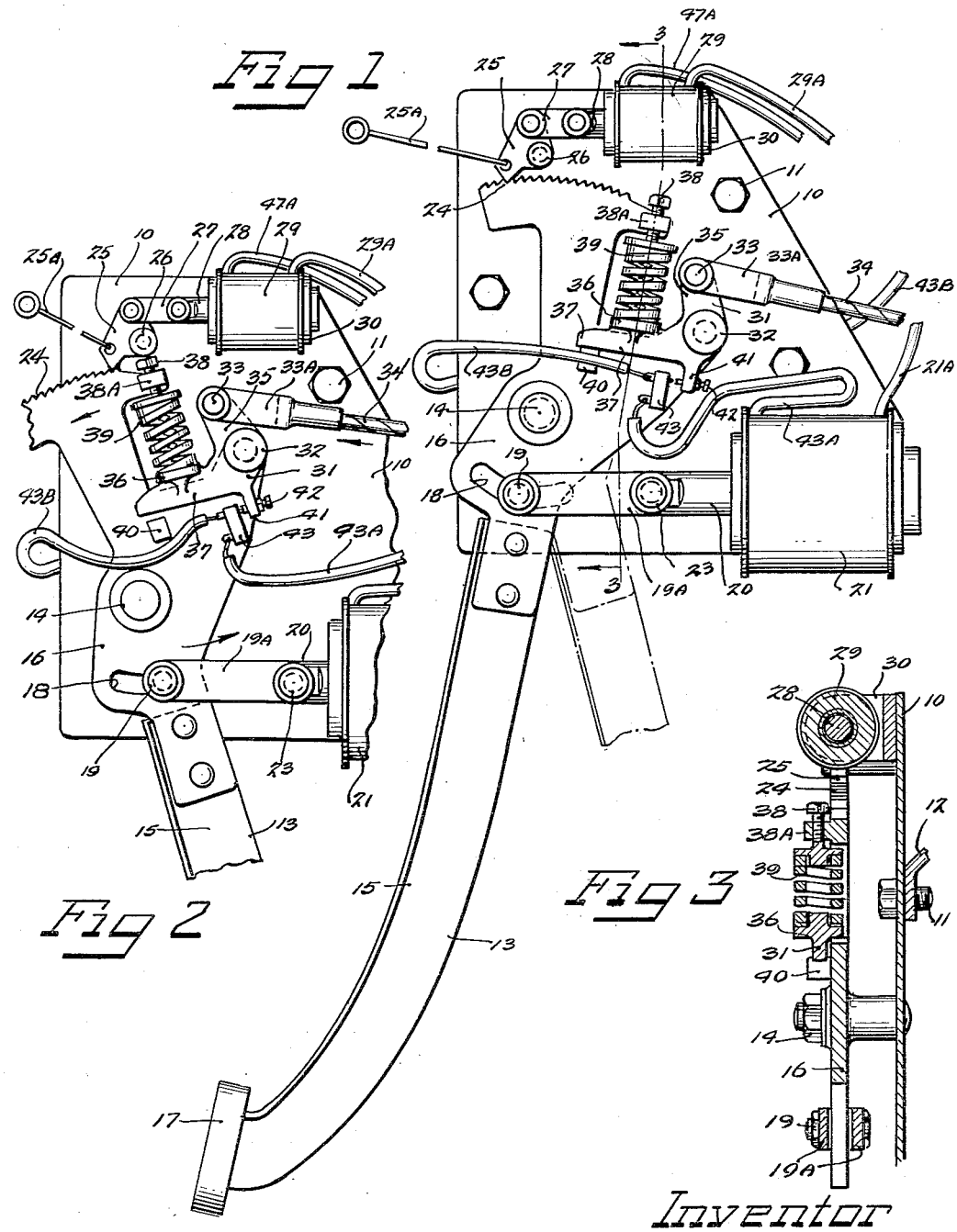
Inventor
JOSEPH F. MARTIN
by Edward M. Apple
Atty.

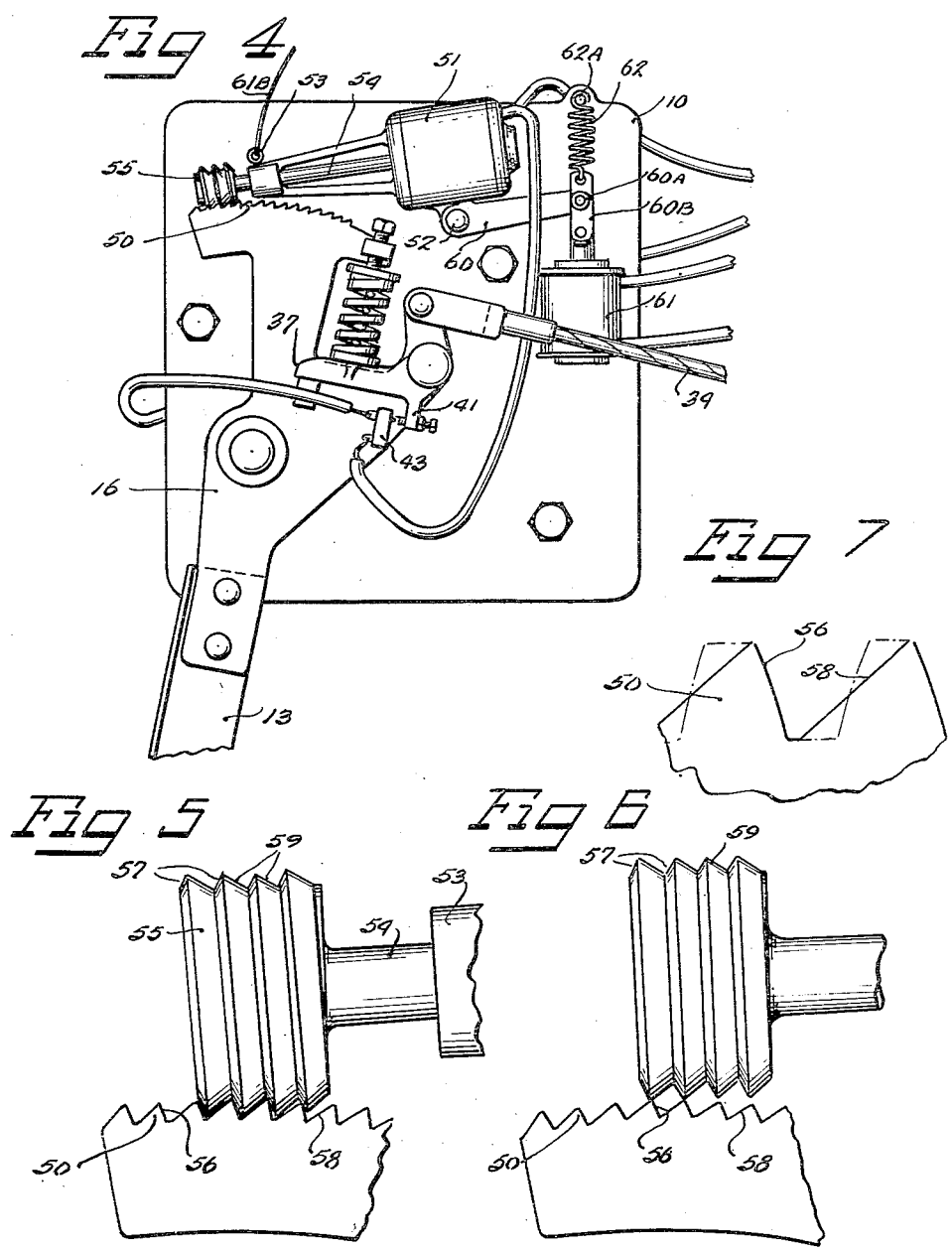

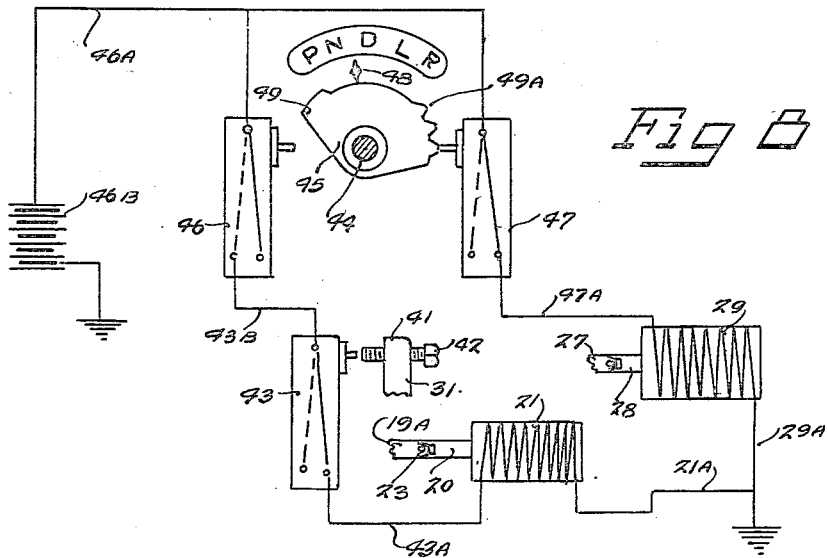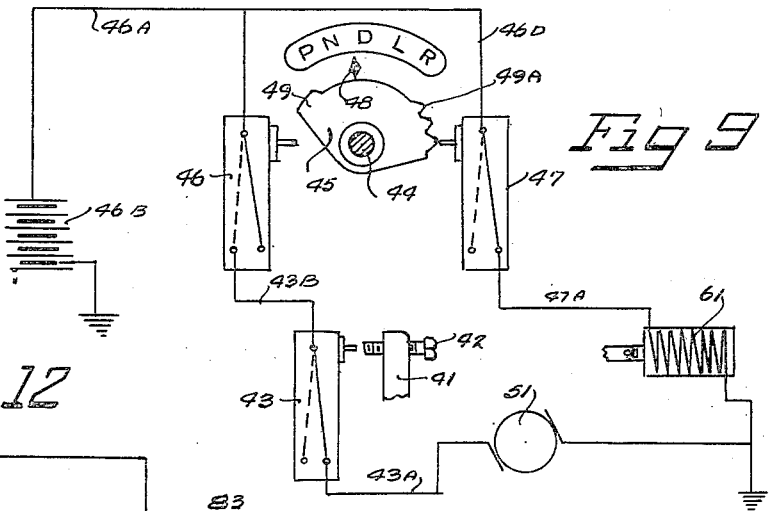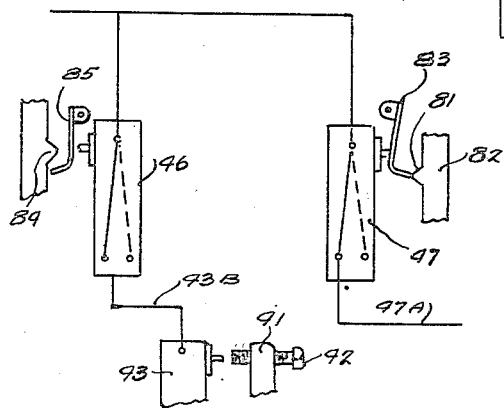

Inventor
JOSEPH F MARTIN
By Edward M. Apple
Atty.

United States Patent Office 2,821,275
Patented Jan. 28, 1958

2,821,275

POWER OPERATED EMERGENCY BRAKE

Joseph F. Martin, Detroit, Mich., assignor to Mabel M. Martin, Detroit, Mich., and himself as tenants by the entireties with rights of survivorship Application January 27, 1956, Serial No. 561,858

10 Claims. (Cl. 192—4)

This invention relates to automotive vehicles, and particularly to an emergency brake mechanism for the same.

An object of the invention is to provide automatic, power means, for setting and releasing the emergency brakes of an automotive vehicle, which means may be considered an improvement on the means disclosed in my issued patents, numbers: 2,725,128, 2,725,129, 2,725,130, 2,725,131.

In the patents previously issued to me, the numbers of which are hereinabove set out, I disclosed automatic means for setting and releasing the conventional, hand, push-pull type of emergency brake mechanism. In this application, I disclose automatic power means, for setting and releasing a conventional, foot operated, lever type of emergency brake mechanism, combined with both, the steering column type of speed selector mechanism, and the so-called "push-button drive" type of speed selector mechanism used to control automatic transmissions.

Although I have herein disclosed certain specific power means, for shifting and releasing the emergency brake, it will be understood that hydraulic, or pneumatic, or other power means, could as readily be employed, while using the control elements herein disclosed.

Another object of the invention is to provide an automatic, power operated, emergency brake, with means for manual control, in the event of a power failure.

Another object of the invention is to provide an automatic, power operated, emergency brake with means for limiting the travel of the brake setting mechanism, to compensate for variations caused by wear in the brake bands and in the control linkage.

Another object of the invention is to provide an automatic, power operated, emergency brake, with means to permit the moving of the vehicle, if desired, when the transmission is in neutral.

Another object of the invention is to provide automatic power means, for engaging and dis-engaging the emergency brake, which may readily be installed on old or new motor vehicles, which are equipped with conventional emergency brake mechanisms and automatic transmissions.

Another object of the invention is to provide means for automatically engaging, or disengaging, the emergency brake, simultaneously with the changing of the position of the transmission speed selector mechanism.

Another object of the invention is to provide automatic power means for engaging and releasing the emergency brake mechanism, which power means are controlled by the manual operation of selecting a predetermined position on the automatic transmission control mechanism, without in any way, interfering with the normal functioning of the automatic transmission.

The foregoing and other objects and advantages of the invention will become more apparent as the description proceeds, reference being made from time to time to the accompanying drawings, forming part of the within disclosure, in which drawings:

Fig. 1 is an elevational view of a solenoid operated, foot lever type of emergency brake control, used with motor vehicles having an automatic transmission. This view shows the emergency brake in "off" position.

Fig. 2 is a view, similar to Fig. 1, with parts broken away, and showing the emergency brake in "on" position.

Fig. 3 is a section taken substantially on the line 3—3 of Fig. 1.

Fig. 4 shows a modified form of power means for setting and releasing the emergency brake. In this embodiment, the brake is engaged by means of a motor and is released by means of a solenoid.

Fig. 5 is an enlarged, fragmentary detail, of the worm drive and gear, illustrated in Fig. 4, when in operating position.

Fig. 6 is a view similar to Fig. 5 but showing the worm drive and gear in released position.

Fig. 7 is an enlarged fragmentary detail, illustrating the special shape of the faces of the worm and gear teeth.

Fig. 8 is a diagrammatic view, illustrating the electrical circuits and control means, employed with the structure shown in Figs. 1, 2 and 3.

Fig. 9 is a diagrammatic view, illustrating the modified form of structure, shown in Figs. 4 to 7 inclusive.

Fig. 12 is a diagrammatic view of a portion of the push-button control circuit employed with the mechanism shown in Figs. 10 and 11.

Figure 10:
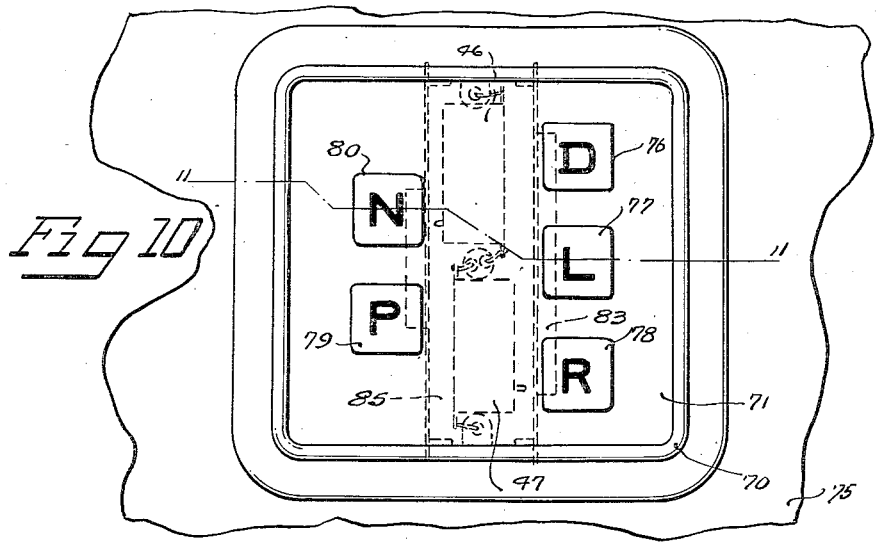
Fig. 10 is a top plan view of a so-called "push-button drive" type of control, for an automatic transmission, which has been modified to cooperate with the elements disclosed in Fig. 1, for controlling the emergency brake.

Referring now more particularly to the drawings, it will be understood that in the embodiment herein disclosed, the reference character 10 indicates a mounting plate, which is secured by means of screws 11 (Fig. 3) to ears 12, which constiute part of the body frame (not shown), of a motor vehicle, equipped with a foot lever operated emergency brake, and an automatic transmission, having one or the other of the speed selector mechanisms, such as disclosed in Figs. 8 to 12 inclusive. The mounting plate 10 is positioned, in conventional manner, on the driver's side of the vehicle, for convenient manipulation by the driver, of the foot lever 13, which is pivoted, as at 14, to the mounting plate 10. The foot lever 13 consists of a length of heavy metal, preferably having a T-shaped cross-section 15, a bearing plate 16, and foot piece 17. The bearing plate 16 has formed therein a slot 18, in which is adapted to ride a pivot pin 19, which supports one end of a pair of links 19A, the opposite ends of which connect to the end 20 of the plunger of the operating solenoid 21, as at 23.

Formed on the upper edge of the bearing plate 16 is a series of ratchet teeth 24 (Figs. 1 and 2), which are adapted to receive the locking pawl 25, which is pivoted to the mounting plate 10, as at 26. A release pull cable 25A is secured to the pawl 25, so that it may be manually released from the teeth 24, in the event of a power failure. A pair of links 27 connect the pawl 25 to the plunger 28 of a release solenoid 29, which is mounted to ears 30, which are preferably sheared out of the mounting plate 10.

Mounted on one side of the bearing plate 16 (Figs. 1–3), is a tension control device consisting of a bell crank 31, and associated parts, which are pivoted on a stud 32. Pivoted as at 33 to one leg 35 of the bell crank 31 (Figs. 1 and 2) is a clevis 33A, the other end of which is secured, by any suitable means, to the spring loaded wire cable 34, which actuates the emergency brake mechanism (not shown). The cable 34 is spring loaded, to normally hold the emergency brake in "off" position. Positioned between a seat 36, formed on the leg 37, of the bell crank 31, and an adjusting screw 38, which threadedly engages an opening in an ear 38A formed on the upper portion of the bearing plate 16, is a heavy spring 39, which is adapted to yieldably force the arm 37, of the bell crank 31, against a stop block 40, formed on the bearing plate 16. A third arm 41A, of the bell crank 31, carries an adjusting screw 42, which is adapted to contact the operating pin of a snap switch 43, one side of which connects, through the conductor 43A, to the solenoid 21, and the other side of which connects, as at 43B, in the circuit (Fig. 8) as hereinafter described.

Mounted on the selector shaft 44 (Fig. 8), of a conventional speed selector mechanism, of an automatic transmission (not shown), is a cam plate 45, with a series of lugs on its edge, which lugs are adapted to operate the snap switches 46 and 47, which are preferably mounted, in any suitable manner, on the steering column (not shown), of the vehicle. The switch 46 is connected, as at 46A, to the automobile storage battery 46B. The switch 46 is also connected to the solenoid 21 through the connector 43B, the snap switch 43 and connector 43A. The switch 47 is connected, as at 47A, to the solenoid 29, which in turn is connected to ground as at 29A. The solenoid 21 is also connected to the solenoid 29, through the conductor 29A, and to the ground, by means of the conductor 21A.

Operation

When the speed selector shaft 44 is moved to a position, where the indicator 48 indicates "P" for "park" position, the broad leg 49 on the cam plate 45 contacts the actuator pin of the normally open snap switch 46. This feeds current through the conductor 43B, and through the normally closed snap switch 43, to the actuating solenoid 21, causing the plunger 20 thereof, through the linkage 19A and 19, and the bearing plate 16, to move the bottom of the foot pedal 13 to the right (Fig. 1) and toward the emergency brake locking position. The pivoting of the bearing plate 16, about the pivot point 14, carries the tension mechanism in the opposite direction, until the tension on the cable 34 is sufficient to overcome the spring 39, allowing the bell crank 31, to rotate about its pivot point 32. This movement causes the adjusting screw 42 to move into contact with the operating pin, on the normally closed snap switch 43, causing the latter to open. This cuts off the current to the operating solenoid 21. During the rotation of the bearing plate 16, about its pivot point 14, the holding pawl 25 has engaged the ratchet teeth 24, on the bearing plate 16. This now locks the foot pedal 13 in the brake "on" position. It will be understood that the movement of the brake pedal is controlled by the tension on the operating cable 34, so that the brakes will always be set with the correct amount of tension, regardless of their condition, because of wear and the like.

When the selector shaft 44 (Fig. 8) is moved to either "drive," "low" or "reverse," one of the three lobes 49A will contact the operating pin of the normally open snap switch 47, closing the circuit, so as to energize the solenoid 29. This causes movement of the plunger 28 of the solenoid 29, which rotates the locking pawl 25, about its pivot point 26, whereby the pawl 25 is moved out of engagement with the ratchet teeth 24 on the bearing plate 16. This allows the foot pedal 13 to be returned to the brake "off" position, under the influence of the spring tension on the brake cable 34. I prefer to use three lobes 49A on the cam plate 45 to assure the prompt release of the emergency brake, no matter to which position the selector shaft 44 is moved, among the "drive," "low" and "reverse" positions.

An extension of the slot 18, in the bearing plate 16, allows the brake to be set manually, by pushing forward on the foot piece 17. This action carries with it the bearing plate 16, which is attached to the upper portion of the foot pedal 13, permitting the ratchet teeth 24 to engage the locking pawl 25. In the event of power failure, the locking pawl 25 may be manually released from the ratchet teeth 24, by pulling the release cable 25A.

Referring now to the modified form of the device, illustrated in Figs. 4, 5, 6, 7 and 9, it will be understood that a worm gear 50, using a special shaped tooth, is cut on the upper edge of the bearing plate 16, in place of the ratchet teeth 24, as previously described. A motor 51 is pivotably mounted on a stud 52, which is secured to the base plate 10. The motor 51 has an extended front bearing 53 which supports the outer end of the armature shaft 54, at the end of which is mounted for rotation, a worm 55, which is adapted to drive the gear 50, through the normal worm and gear action. It will be noted (Figs. 5, 6 and 7) that the faces 56 of the gear teeth, and the faces 57 of the worm drive, are of conventional involute shape. The opposite faces 58 and 59 respectively, are shaped as ratchet teeth, so that the members may function in two capacities, as hereinafter described.

An arm 60, which is part of the motor 51 mounting, extends to the rear of the motor 51, and is pivoted as at 60A, to linkage 60B, which connects to the plunger of a release solenoid 61. A pull string 62 is connected at one end to the linkage 60B, and at the other end, to a stud 62A, which is secured to the mounting plate 10. This spring 62 normally rocks the motor 51 on its bearing 52, and holds the worm 55 in yieldable engagement with the teeth 50.

Operation of modified form

The operation of the modified form (Figs. 4, 5, 6, 7 and 9) is similar to the brake operating and release mechanisms previously shown and described, in relation to Figs. 1, 2, 3 and 8. In this modification, however, when the snap switch 46 is actuated, the motor 51 drives the bearing plate 16 forward, until the proper tension has been put on the brake pull cable 34, at which time the arm 41 of the tension device, actuates the switch 43 (Figs. 4 and 9) and cuts out the motor 51. The self locking action of the faces 56 and 57, of the worm and worm gear, locks the bearing plate 16 in brake "on" position and maintains a set tension on the pull cable 34.

The actuation of the switch 47 (Fig. 9), by the lobes 49A, on the cam plate 45, in turn actuates the release solenoid 61 (Fig. 4), which rocks the motor 51, and the worm drive 55 about the bearing 52. As the worm 55 is lifted out of engagement with the teeth 50, on the bearing plate 16, the plate 16 returns to the brake "off" position under the influence of the tension on the brake pull cable 34.

When the emergency brake is set manually, by pushing forward on the foot pedal 13, the ratchet faces 58 on the teeth 50, cam the faces 59 on the shell 55 upwardly, permitting the plate 16 to move forward into the next locking position. Release of the worm 55, from the teeth 50 is effected by actuating the switch 47, which causes the solenoid 61 to rock the motor 51. Manual release, in the event of power failure, may be effected by means of a pull cable 61B, which is secured to the bearing member 53.

Figure 11:
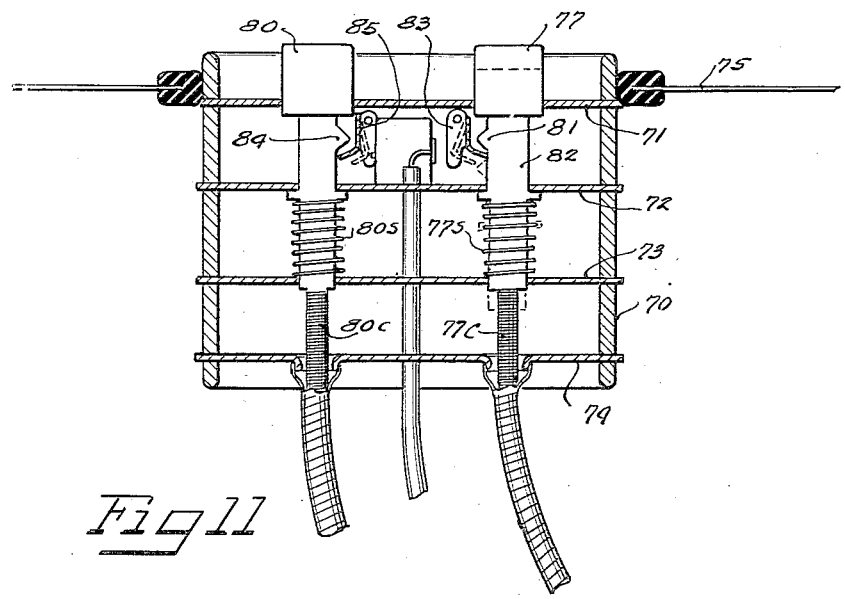
Fig. 11 is a section, taken substantially on the line 11—11 of Fig. 10.

In the modification shown in Figs. 10, 11 and 12, I disclosed a "push-button drive" type of automatic transmission control, which has been adapted for use in controlling either the solenoid operated, brake set and release mechanisms, shown in Figs. 1 to 3, or the motor driven, brake set and release mechanism, shown in Figs. 4 to 7 inclusive.

In this modification, a box frame 70, having a set of four divider plates 71, 72, 73 and 74 secured thereto, is preferably mounted on the instrument panel 75, or in any other suitable location on the motor vehicle. Push-buttons 76, 77, 78, 79 and 80 are mounted, for reciprocation, in suitable openings in the plates 71, 72, 73 and 74. Each push-button is respectively connected to a push-pull cable, as indicated by the reference characters 80C and 77C (Fig. 11), and are spring loaded as at 80S and 77S. The said push-buttons and cables actuate conventional valve mechanisms (not shown), which control the automatic transmission, as in conventional practice. The push-buttons 76, 77 and 78, which are respectively marked "D" for "Drive"; "L" for "Low" and "R" for "Reverse," have cam projections 81 formed on their stems 82. A bail 83 is pivotably mounted in the box frame, in such a position that when any one of the three push-buttons 76, 77 or 78 is depressed, the cam 81 contacts the bail 83, and swings it back far enough to actuate the snap switch 47, which in turn actuates the release solenoids, controlling the mechanisms as illustrated in the previous figures, and herein above described. The operation of any one of the three buttons indicated, will operate either of the release solenoids illustrated in the previous views. Each of the push-buttons 79 and 80, likewise has a cam projection 84 on its stem, which when depressed, causes a similarly mounted bail 85, to swing back far enough to actuate the switch 46, which in turn actuates, either the brake "On" solenoid 21 (Figs. 2 and 3), or the motor 51 (Fig. 4), causing the emergency brakes to lock the car, as previously described. The release of the brakes is effected as previously described.

From the foregoing, it will be seen that I have devised novel power means, for setting and releasing the emergency brakes of any conventional motor vehicle, being equipped with an automatic transmission.

Having described my invention, what I claim and desire to secure by Letters Patent is:

1. In a motor vehicle, having an emergency brake mechanism, including a foot lever for actuating the emergency brake pull cable, and an automatic transmission speed selector mechanism, the combination of a member secured to said foot lever and moveable therewith, means connecting said last named member to said cable, power means for moving said member, means for locking said member in predetermined positions, power means for releasing said locking means, and means responsive to the movement of said automatic transmission speed selector means, for controlling each of said power means.

2. The structure defined in claim 1, which includes adjustable, resilient means, interposed between said first named member and said cable.

3. The structure defined in claim 1, in which said first named member comprises a plate having teeth formed along a marginal edge, said teeth being arranged to receive one of the elements comprising said locking means, and said plate, having a slot therein, arranged to receive one of the elements comprising the power means for moving said plate.

4. The structure defined in claim 1, in which said power means for moving said first named member consists of a solenoid, the plunger of which is linked to said member, and said locking release power means, includes a solenoid, the core of which is linked to a locking pawl, which is mounted for intermittent engagement with elements formed on said first named member.

5. The structure defined in claim 1, in which said power means for moving said first named member, includes a motor rockably mounted adjacent said member, said motor having a worm drive rotatable with its shaft, said worm being arranged to engage teeth formed on said member, and said locking release means includes a solenoid for rocking said motor.

6. The structure defined in claim 1, in which the control means, for each of said power means, include circuits, which are connected to the electrical system of said motor vehicle.

7. The structure defined in claim 1, including manually operable means for releasing said locking means in the event of a power failure.

8. The structure defined in claim 1, in which said speed selector mechanism includes a manual control arm, and said power control means includes cams moveable with said arm, said cams being positioned to open and close switches located in electrical circuits connected to each of said power means and to the electrical system of the vehicle.

9. The structure defined in claim 1, in which said speed selector mechanism includes a plurality of manual push buttons, each of which has associated with it, means for opening and closing switches located in circuits connected to the electrical system of the vehicle and to each of said power means.

10. The structure of claim 1, in which said first named member comprises a plate having teeth along one marginal edge, and said power means includes a motor with a worm rotatable thereby, said teeth and said worm having two types of faces thereon, whereby upon the rotation of said motor, while certain of said faces are in contact with each other, said plate will be moved by said motor, and upon non-rotation of said motor while others of said faces are in contact, said plate may be manually moved with respect to said worm.

References Cited in the file of this patent
UNITED STATES PATENTS

| | | |
|---|---|---|
| 2,725,130 | Martin | Nov. 29, 1955 |
| 2,725,131 | Martin | Nov. 29, 1955 |